(12) United States Patent
Pai (10) Patent No.: US 6,683,553 B1
(45) Date of Patent: Jan. 27, 2004

(54) MECHANISM FOR TRANSMITTING FROM A SENSOR ASSEMBLY TO AN ACQUISITION SYSTEM A MESSAGE THAT INCLUDES SELF-DESCRIBING INFORMATION

(75) Inventor: Vinay S. Pai, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 10/256,916

(22) Filed: Sep. 26, 2002

(51) Int. Cl.[7] .......................... H03M 1/12; G06F 13/38; H04L 12/24
(52) U.S. Cl. .......................... 341/155; 710/69; 707/513
(58) Field of Search .......................... 341/155; 710/33, 710/69; 707/513, 531

(56) References Cited

U.S. PATENT DOCUMENTS

| | | | | |
|---|---|---|---|---|
| 5,259,063 A | * | 11/1993 | Salazar | 706/4 |
| 5,499,023 A | * | 3/1996 | Goldschmidt | 340/870.37 |
| 5,631,839 A | * | 5/1997 | Lemoine | 700/108 |
| 6,013,108 A | * | 1/2000 | Karolys et al. | 702/189 |
| 6,047,244 A | * | 4/2000 | Rud, Jr. | 702/98 |

FOREIGN PATENT DOCUMENTS

| | | | | |
|---|---|---|---|---|
| EP | 1096724 | * | 2/2001 | H04L/12/24 |

* cited by examiner

Primary Examiner—Peguy JeanPierre
(74) Attorney, Agent, or Firm—Thomas J. Treutler; Hickman Palermo Truong & Becker LLP (57) ABSTRACT

A mechanism for transmitting from a sensor assembly to an acquisition system a message that includes self-describing information is provided. The sensor assembly monitors elements, such as pipes and wells, and detects analog values, such as temperature or pressure, emanating from the elements. The sensor assembly translates the analog values into digital values, creates messages that include information that uniquely identifies the sensor assembly and the digital values, where the information and the digital values are self-described, and transmits the messages to an acquisition system.

20 Claims, 5 Drawing Sheets

```
<SENSOR> ~ 202
    SENSOR 1.TEMPERATURE.FLOWLINE.SUN.COM ~ 204
</SENSOR> ~ 206
<READING> ~ 208
    <VALUE> 55 </VALUE> ~ 210
    <UNIT> DEG F </UNIT> ~ 212
</READING> ~ 214
```

MECHANISM FOR TRANSMITTING FROM A SENSOR ASSEMBLY TO AN ACQUISITION SYSTEM A MESSAGE THAT INCLUDES SELF-DESCRIBING INFORMATION

FIELD OF THE INVENTION

The present invention relates to data acquisition and more specifically to a mechanism for transmitting from a sensor assembly to an acquisition system a message that includes self-describing information.

BACKGROUND

In oil fields, there are many elements, such as piplines and wells, for which information, such as the temperature or pressure, is gathered and transmitted to an acquisition system for processing. Sensors of various types monitor these elements and detect analog values, such as temperature or pressure, emanating from these elements. The sensors are interconnected with a bus, which may be associated with a bus controller. Old style sensors transmit the analog values to the bus controller, which uses a table to convert the analog values to digital values. The bus controller transmits the digital values to an acquisition system that collects the digital values, performs calculations on the digital values, saves the digital values and/or the calculations on persistent media, and displays the digital values and/or the calculations on a remote display.

In order to perform these types of functions, various proprietary systems, such as Computer Automobile Network, ProfiBus, and Fieldbus, have arisen. These proprietary systems provide, among other things, sensors, busses, and bus controllers, that are used in these proprietary systems. However, one of the problems with these proprietary systems is that the parts from one system are not interchangeable with the parts from another system. For example, it is not possible to use a sensor from one proprietary system with a bus from another proprietary system. As a result, it is not possible to mix the optimal parts of one system with the optimal parts of another system to create an overall optimal system.

Based on the foregoing, it is desirable to provide an improved mechanism for monitoring physical events and for transmitting information associated with these physical events to an acquisition system.

SUMMARY

In accordance with one embodiment of the present invention, there is provided a mechanism for transmitting from a sensor assembly to an acquisition system a message that includes self-describing information. The sensor assembly monitors elements, such as pipes and wells, and detects analog values, such as temperature or pressure, emanating from the elements. The sensor assembly translates the analog values into digital values, creates messages that include information that uniquely identifies the sensor assembly and the digital values, where the information and the digital values are self-described, and transmits the messages to an acquisition system. Because the messages are self-describing, the acquisition system can receive and comprehend messages from any sensor assembly. This is so regardless of the type of sensor assembly and the manufacturer of the sensor assembly. As a result, different types and makes of sensor assemblies may be used in the same acquisition system.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENT (S)

A mechanism for transmitting, from a sensor assembly to an acquisition system, a message that includes self-describing information is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

A System Overview

Figure 1A:
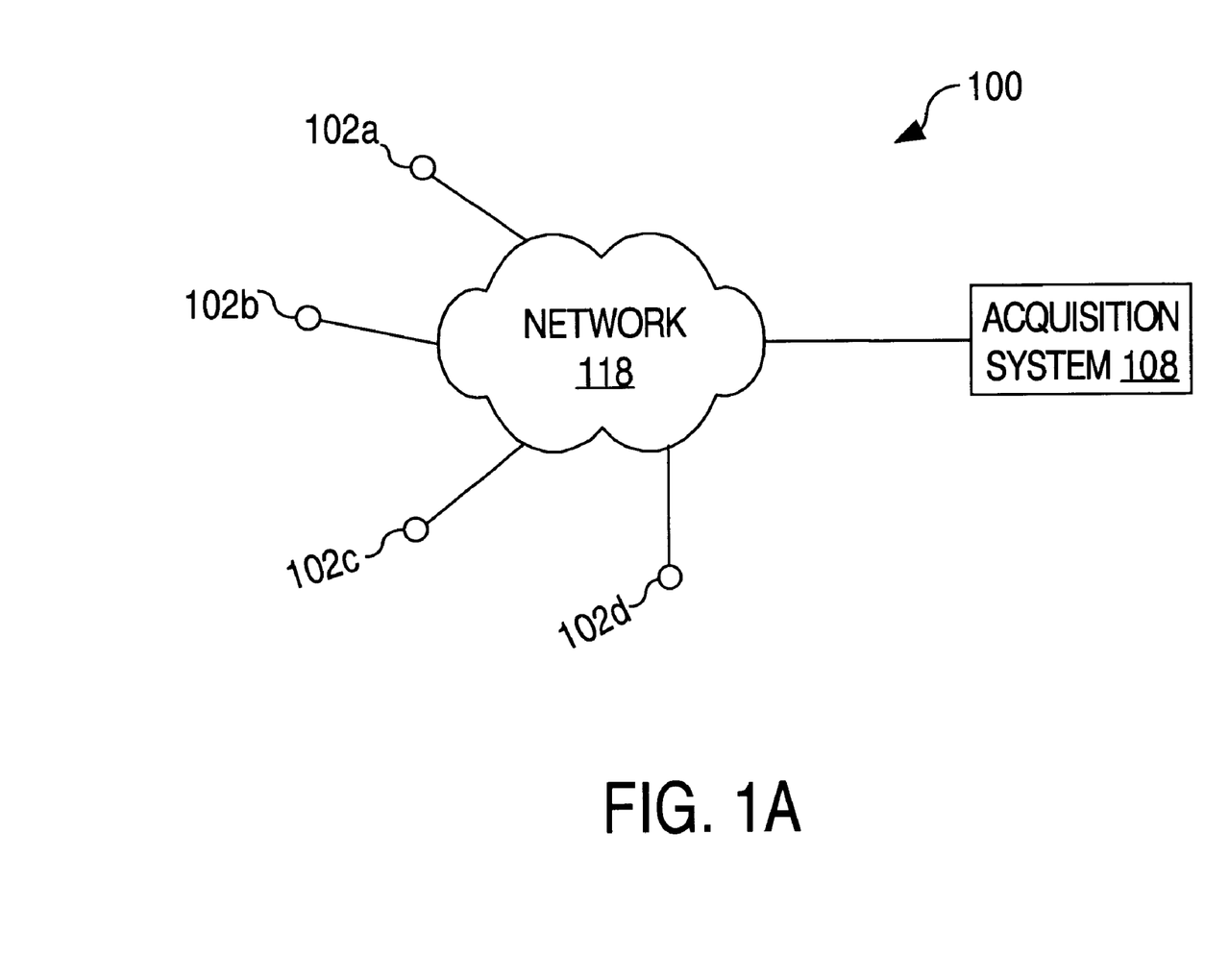
FIGS. 1A and 1B are block diagrams of a system for transmitting, from a sensor assembly to an acquisition system, a message that includes self-describing information according to one embodiment of the present invention.

FIG. 1A shows a system 100 in which one embodiment of the present invention may be implemented. As shown, system 100 comprises a network 118, a plurality of sensor assemblies 102 coupled to the network 118, and an acquisition system 108 coupled to the network 118. In system 100, each sensor assembly 102 behaves like a regular network element. As such, each sensor assembly 102 has a unique network address. In addition, each sensor assembly 102, using any known network protocol, can send messages to other elements (e.g. acquisition system 108) on the network 118, and can receive messages from other elements on the network 118. For purposes of the present invention, any network protocol may be used to enable communication between the various network elements.

To further facilitate message exchange, each sensor assembly 102 communicates with the acquisition system 108 via messages that are self-describing. That is, in addition to having content, the messages comprise information that describes the content. These self-describing messages enable the acquisition system 108 to easily comprehend and to process the information in the messages. As a result, the messages need not be sent in any proprietary format, and the acquisition system 108 need not be configured to understand any proprietary format. This in turn enables any sensor assembly 102, regardless of type or make, to be used in the system 100.

Sensor assemblies 102 are positioned at or near elements, such as pipes and wells, for gathering information associated with these elements. Information, detected by the sensor assemblies 102 is assembled into messages, and transmitted over network 118 to the acquisition system 108, where the information is gathered by the acquisition system 108.

Figure 1B:
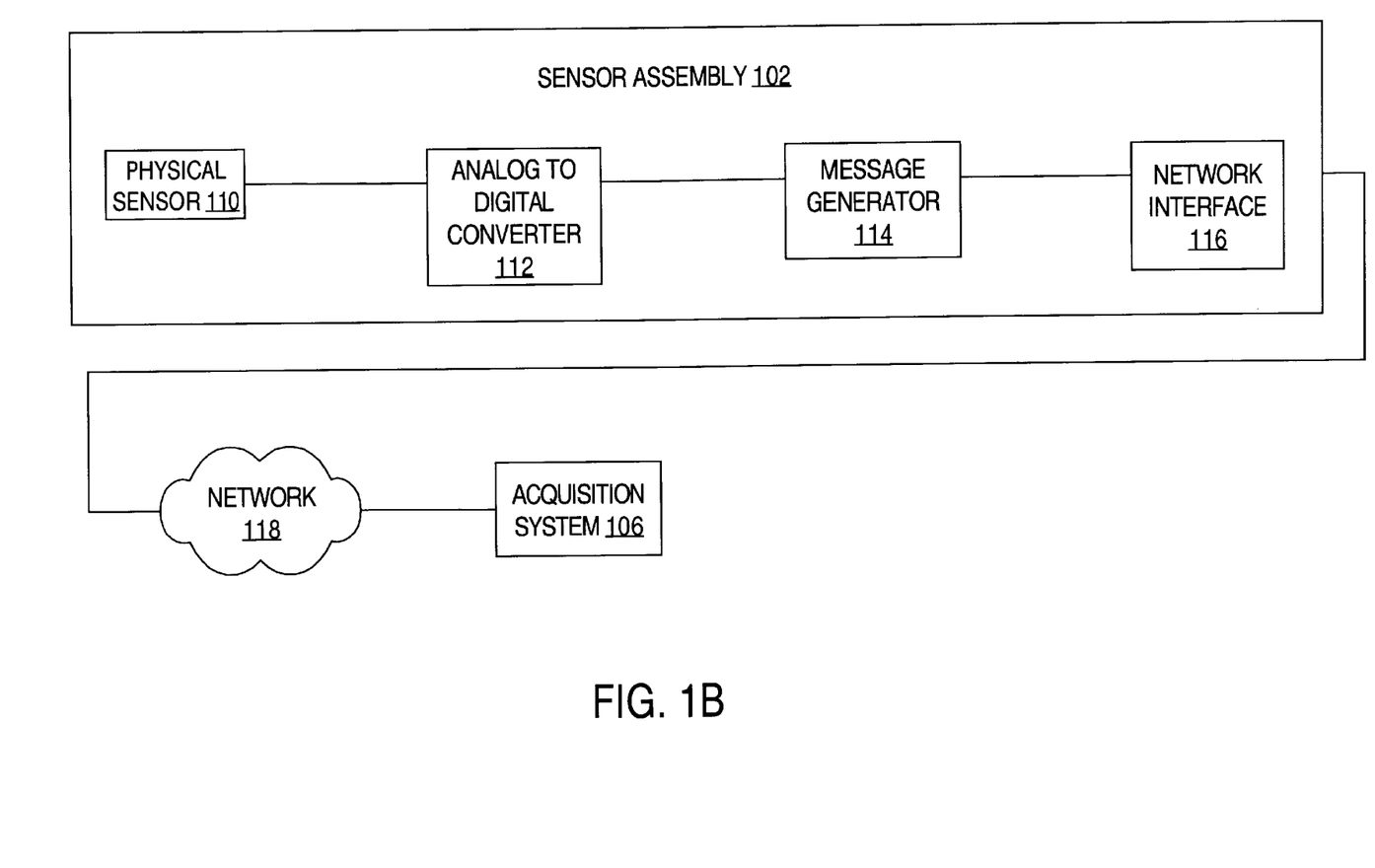

FIG. 1B shows a more detailed diagram of a sensor assembly in accordance with one embodiment of the present invention. As shown, the sensor assembly 102 comprises a physical sensor 110, an analog-to-digital-converter 112, a message generator 114, and a network interface 116. The physical sensor 110 monitors an element to detect the analog values emanating from the element. Examples of analog values that are detected include, but are not limited to, temperature, rate of flow, alarm conditions, pressure, density, level of concentration, revolutions per minute, mass, pounds per minute, force, and volume. These analog values are provided as examples and should not be construed as the only possible analog values that can be detected.

The analog-to-digital-converter 112 converts the analog values to digital values. According to one embodiment, the analog-to-digital-converter 112 uses an algorithm to convert an analog value to a digital value. The message generator 114 creates a message that includes the digital value, and initiates transmission of the message to the acquisition system 108 as will be described in more detail. The network interface 116 includes a network card that is configured to implement a protocol to communicate over the network 118.

Possible Hardware and Software Configurations

There are many different possible ways to configure the various elements, such as the sensor assembly 102 and the acquisition system 108, on the network 118. Configuring the sensor assembly 102 involves configuring two parts of the sensor assembly 102, which are the network interface 116 and the message generator 114. Configuring the sensor assembly 102 and the acquisition system 108 involves hardware and/or software as will be described in more detail.

As already stated, the network interface 116 includes a network card that is configured to implement a protocol to communicate over the network 118. The network interface 116 can be configured with any real-time serialization protocol. According to one embodiment, the network interface 116 includes an ethernet card and is configured to implement the transmission control protocol/internet protocol (TCP/IP). According to other embodiments, the network interface 116 could be wireless ethernet.

The message generator 114 can be embodied as a processor executing software or as hardwired logic, such as an application specific integrated circuit (ASIC).

The message generator 114 and the acquisition system 108 can use many different protocols to communicate with each other. These protocols include, but are not limited to, Remote Procedure Call (RPC) or Extensible Markup Language (XML) messaging. For example, Java Api for XML Remote Procedure Call (JAX-RPC) could be used for RPC, and Java API for XML Messaging (JAXM) could be used for XML messaging. The chosen protocol can be configured to run either synchronously or asynchronously.

According to one embodiment, the message generator 114 is configured as a web service client, such as a JAVA web service client.

According to one embodiment, the acquisition system 108 is configured to include a registered end-point. A registered end-point, which is a method or a remote procedure on the acquisition system 108, is registered with a registry. Therefore, the message generator 114 can use the registry to find a particular registered end-point to which to transmit a message.

According to one embodiment, the acquisition system 108 is configured to use servlets. For example, the acquisition system 108 could be configured as an RPC registered end-point using servlets. According to one embodiment, the acquisition system 108 is configured as a web service provider, such as a JAVA web service provider using the Web Services Pack.

The Message

Figure 2:
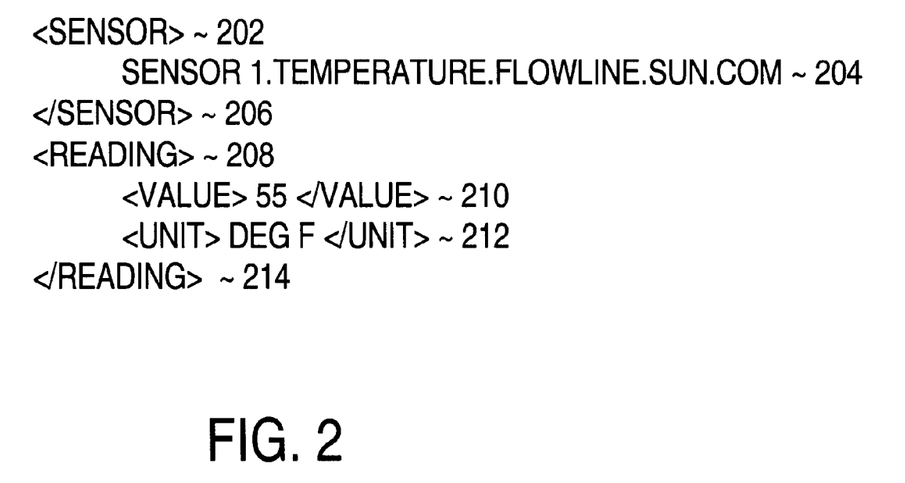
FIG. 2 depicts a message, which includes self-describing information, created by a sensor assembly.

The sensor assemblies 102 create messages that include self-describing information, such as addresses that uniquely identify the sensor assemblies 102 and digital values, as will be described in more detail. FIG. 2 depicts a message, which includes self-describing information, created by a sensor assembly 102, and more specifically by a message generator 114. According to one embodiment, the message is an XML document with XML tags for self-describing the information in the XML document. For the discussion of this section, assume that sensor assembly 102a has an address "sensor1.temperature.flowline.sun.com", is near a pipe, and has detected an analog value, 55 degrees Fahrenheit, emanating from the pipe.

Since the sensor assembly 102a behaves like a regular network element, a network address (referred to hereinafter as a "source address") is associated with the sensor assembly 102a. For example, line 204 identifies the source address, which in this example is the human-readable network address "sensor1.temperature.flowline.sun.com", of the sensor assembly 102a. Line 202 is the begin tag and line 206 is the end tag indicating that the information in this message is from a sensor assembly 102a having the address "sensor1.temperature.flowline.sun.com".

Further, since the sensor assembly 102a detects analog values and translates the analog values to digital values, the messages include the digital values. For example, line 210 identifies such a digital value, 55. Line 208 is the begin tag and line 214 is the end tag delineating the digital value. Line 210 depicts the value, which is 55 and line 212 depicts the unit associated with the digital value. For example, line 212 depicts the begin tag delineating the unit, the unit itself, and the end tag delineating the unit. In this example, the digital value, 55, is in degrees Fahrenheit (degF.).

Although, for the purpose of explanation, FIG. 2 is described with XML, other techniques maybe used for self-describing information in messages. For example, messages may be in text and another system of tags that describe the information may be used.

An Operational Overview

Figure 3:
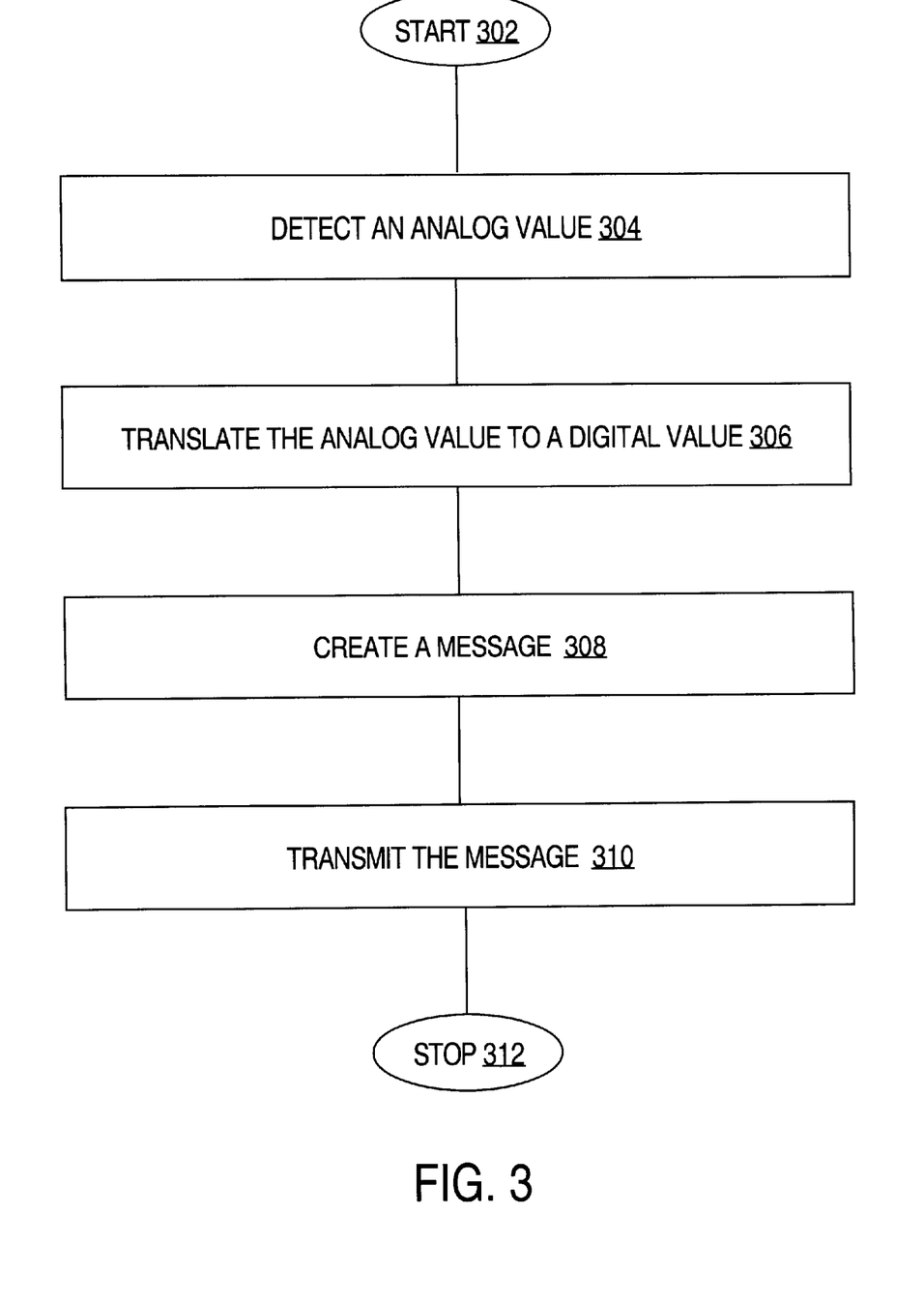
FIG. 3 is a flowchart illustrating the operational flow for transmitting, from a sensor assembly to an acquisition system, a message that includes self-describing information.
Figure 4:
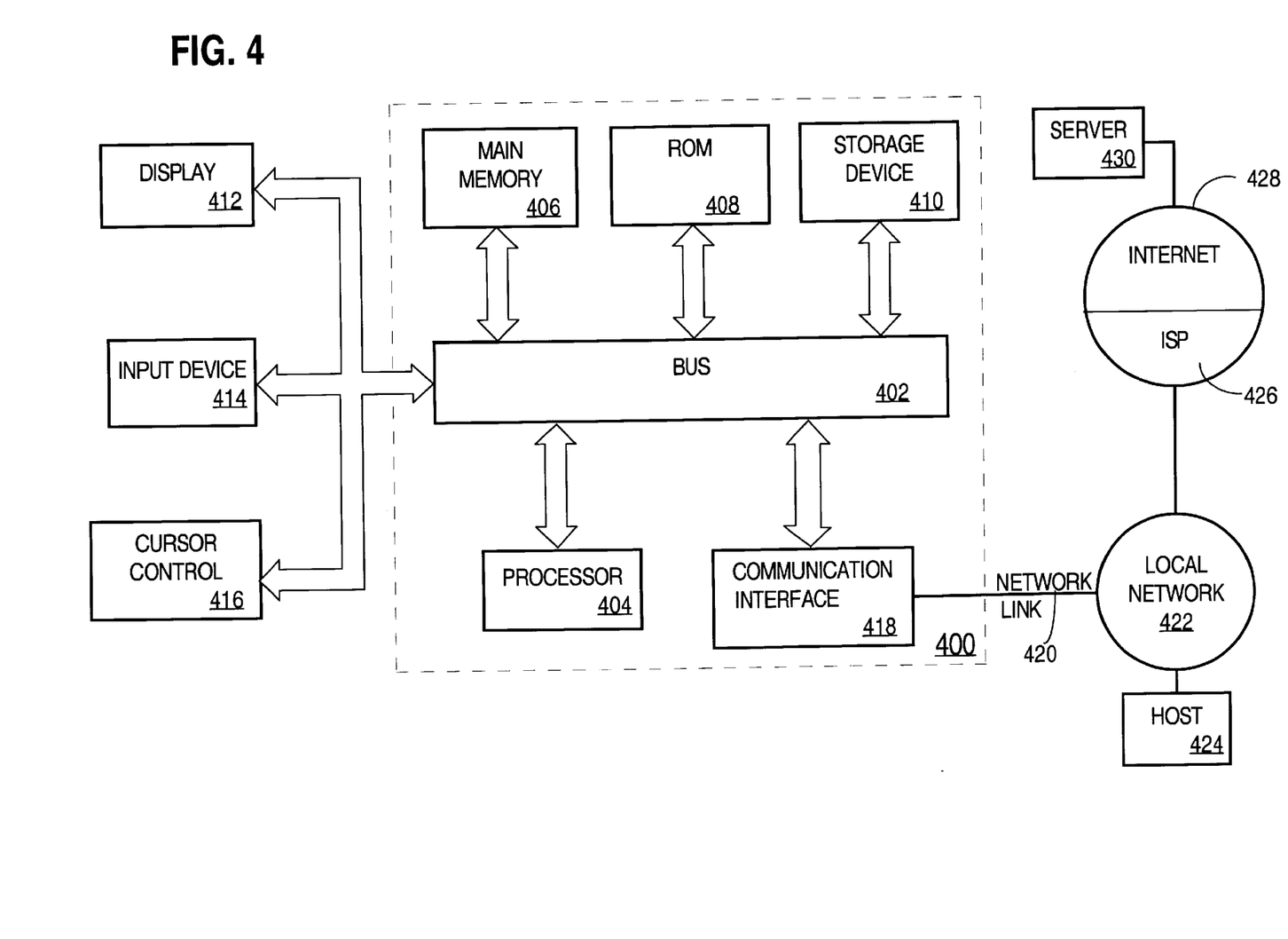
FIG. 4 is a block diagram of a computer system on which embodiments of the invention may be implemented.

FIG. 3 is a flowchart illustrating the operational flow for transmitting, from a sensor assembly to an acquisition system, a message that includes self-describing information. For the discussion of this operational flow, assume that sensor assembly 102a has source address "sensor1.temperature.flowline.sun.com", is near a pipe, and has detected an analog value, 55 degrees Fahrenheit, emanating from the pipe. This discussion of the operational flow also assumes certain hardware and software configurations. For example, the network interface 116 is configured with TCP/IP, and the message generator 114 and the acquisition system 108 are both configured with RPC and XML. The acquisition system 108 is further configured as a registered end point.

At step 302, the process begins.

At step 304, a sensor assembly detects an analog value. For example, the physical sensor 110, of the sensor assembly 102a, detects the analog value, 55 degrees Fahrenheit, emanating from the pipe.

At step 306, the sensor assembly translates the analog value to a digital value. For example, the analog-to-digital-converter 112 translates the analog value of 55 degrees Fahrenheit to a digital value of 55 degrees Fahrenheit. According to one embodiment, the analog-to-digital-converter 112 uses an algorithm to convert the analog value to the digital value.

At step 308, the sensor assembly creates a message. For example, the message generator 114, of sensor assembly 102a, creates a message that includes the digital value, 55, the unit, degrees Fahrenheit, and the source address, "sensor1.temperature.flowline.sun.com", of sensor assembly 102a. Since the message generator 114 is configured to implement XML in this example, the message generator 114 creates an XML document, as depicted in FIG. 2. The created message is saved to storage (not shown).

At step 310, the sensor assembly transmits the message to the acquisition system. Continuing the example, since the acquisition system 108 is configured as a registered end point, the message generator 114 of sensor assembly 102a: (1) uses a registry to find a remote procedure (referred to hereinafter as the "designated remote procedure") associated with the acquisition system 108, and (2) initiates transmission of the message to the designated remote procedure with a remote procedure call. In so doing, the message generator 114 forwards the message to the TCP/IP stack, which is associated with the network interface 116 of sensor assembly 102a. Further, the TCP/IP stack: (1) determines the IP address for the acquisition system 108, (2) builds a TCP/IP version of the message for transmission over the network 118, and (3) transmits the TCP/IP version of the message over the network 118 to the designated remote procedure on the acquisition system 108.

At step 312, the process ends.

After the message is transmitted, the designated remote procedure, on the acquisition system 108, receives the message. The acquisition system 108 may use the source address of the sensor assembly 102a to transmit replies back to the sensor assembly 102, where the replies are processed by the message generator 114.

VARIATIONS

Not only is the sensor assembly described herein useful in oil fields, but the sensor assembly is also useful in many other contexts, such as factories or power plants.

Not only can the sensor assemblies be used for gathering information and transmitting that information to an acquisition system, but the sensor assemblies can also be used to actuate valves and other control structures, based on commands sent by the acquisition system. The acquisition system can analyze the information that is sent by a sensor assembly and determine if the element associated with the sensor assembly should be adjusted in some way. For example, the acquisition system can receive pressure information from a sensor assembly that is monitoring a well. If the pressure is approaching an alarm condition, the acquisition system can transmit commands back to the sensor assembly to open a valve on the well and to shut the valve once the proper pressure is reached. Because the sensor assembly has a unique address, and because this address is included in the message sent to the acquisition system, the acquisition system can use this address to send commands to the sensor assembly.

What is claimed is:

1. A method for transmitting information from a sensor assembly to an acquisition system, comprising:
   detecting at a physical sensor an analog value;
   translating the analog value into a digital value;
   creating a message that includes identification information uniquely identifying a sensor assembly and the digital value, wherein the message further comprises description information describing what the identification information and digital value represent; and
   transmitting the message to an acquisition system.

2. The method of claim 1 wherein the identification information comprises an address of the sensor assembly.

3. The method of claim 1 wherein the message comprises an Extensible Markup Language (XML) document and wherein creating further comprises:
   creating the XML document that includes the identification information uniquely identifying the sensor assembly and the digital value, wherein the XML document further comprises description information describing what the identification information and the digital value represent.

4. The method of claim 1 wherein creating comprises:
   creating a text file that includes the identification information uniquely identifying the sensor assembly and the digital value, wherein the text file further comprises description information describing what the identification information and digital value represent.

5. The method of claim 1 wherein the analog value is selected from the group consisting of temperature, rate of flow, alarm condition, pressure, density, level of concentration, revolutions per minute, mass, mass rate, weight, volume, force, acceleration, and velocity.

6. The method of claim 1 wherein the message further comprises a unit associated with the digital value and wherein creating further comprises:
   creating the message that includes the identification information that uniquely identifies the sensor assembly, the digital value, and the unit associated with the digital value, wherein the message further comprises description information describing what the identification information, the digital value, and the unit represent.

7. An apparatus comprising:
   a physical sensor configured to detect an analog value;
   an analog-to-digital-converter coupled to the physical sensor and configured to translate the analog value to a digital value; and
   a message generator coupled to the analog-to-digital-converter and configured to create a message that includes identification information uniquely identifying a sensor assembly and the digital value wherein the message further comprises description information describing what the identification information and the digital value represent.

8. The apparatus of claim 7 wherein the identification information comprises an address of the sensor assembly.

9. The apparatus of claim 7 wherein the message generator is further configured to create the Extensible Markup Language (XML) document that includes the identification information uniquely identifying the sensor assembly and the digital value wherein the XML document further comprises description information describing what the identification information and the digital value represent, wherein the description information comprises XML tags.

10. The apparatus of claim 7 wherein the message generator is further configured to create the text file that includes the identification information uniquely identifying the sensor assembly and the digital value wherein the text file further comprises description information describing what the identification information and the digital value represent.

11. The apparatus of claim 7 wherein the analog value is selected from the group consisting of temperature, rate of flow, alarm condition, pressure, density, level of concentration, revolutions per minute, mass, mass rate, weight, volume, force, acceleration, and velocity.

12. The apparatus of claim 7 wherein the message further comprises a unit associated with the digital value and the processor is further configured to create further comprises creating the message that includes the identification information that uniquely identifies the sensor assembly, the digital value, and the unit associated with the digital value wherein the message further comprises description information describing what the identification information, the digital value, and the unit represent.

13. The apparatus of claim 7 further comprising a network interface coupled to the message generator and configured to transmit the message to an acquisition system.

14. The apparatus of claim 13 wherein the network interface is selected from the group consisting of ethernet card, rugged ethernet, and wireless.

15. The apparatus of claim 7 wherein the network interface is configured to implement transmission control protocol/internet protocol (TCP/IP) to transmit the message to an acquisition system using TCP/IP.

16. The apparatus of claim 7 wherein the message generator is further configured to implement Remote Procedure Call (RPC) to initiate transmission of the message to an acquisition system using a remote procedure call.

17. The apparatus of claim 7 wherein the message generator is further configured with Extensible Markup Language (XML) messaging to initiate transmission of the message to an acquisition system using XML messaging.

18. The apparatus of claim 7 wherein the message generator is further configured with a real time operating system.

19. The apparatus of claim 7 wherein the message generator comprises an application specific integrated circuit (ASIC).

20. The apparatus of claim 7 wherein the message generator comprises one or more processors executing software.

* * * * *

UNITED STATES PATENT AND TRADEMARK OFFICE
CERTIFICATE OF CORRECTION

PATENT NO. : 6,683,553 B1 Page 1 of 1
DATED : January 27, 2004
INVENTOR(S) : Vinay S. Pai It is certified that error appears in the above-identified patent and that said Letters Patent is hereby corrected as shown below:

Column 6,
Lines 48-49, "compromises" should read -- comprises --.

Signed and Sealed this

Twenty-second Day of June, 2004

JON W. DUDAS
*Acting Director of the United States Patent and Trademark Office*